United States Patent [19]

Klinefelter

[11] 4,073,079
[45] Feb. 14, 1978

[54] DEVICE FOR PUMPING OUT SANDED IN CRAB POTS

[76] Inventor: Nathan I. Klinefelter, Rte. 1, Box 830, Brookings, Oreg. 97415

[21] Appl. No.: 742,361

[22] Filed: Nov. 15, 1976

[51] Int. Cl.² .............................................. E02F 3/00
[52] U.S. Cl. .......................................... 37/78; 114/55
[58] Field of Search .................. 114/55; 37/78, 55; 43/17.2, 5; 134/167 R, 168 R, 172, 173

[56] References Cited

U.S. PATENT DOCUMENTS

| 2,765,567 | 10/1956 | Fifer | 43/17.2 |
| 3,554,300 | 1/1971 | Rosenberg | 114/55 X |
| 3,580,511 | 5/1971 | Hammelman et al. | 134/167 R |

FOREIGN PATENT DOCUMENTS

| 998,423 | 9/1951 | France | 114/55 |
| 949,118 | 2/1949 | France | 114/55 |

*Primary Examiner*—Clifford D. Crowder
*Attorney, Agent, or Firm*—Lee R. Schermerhorn

[57] ABSTRACT

A nozzle pipe has upper and lower guide rings to guide the nozzle down a pot line to the crab pot. A hydraulic pump of the pipe discharges a jet of sea water to wash away drifted sand which anchors the crab pot to the sea bottom. The pump is driven by a hydraulic motor powered by a hydraulic system on a ship whereby the hydraulic motor circuit is not affected by the sea water pressure.

3 Claims, 3 Drawing Figures

U.S. Patent   Feb. 14, 1978   4,073,079
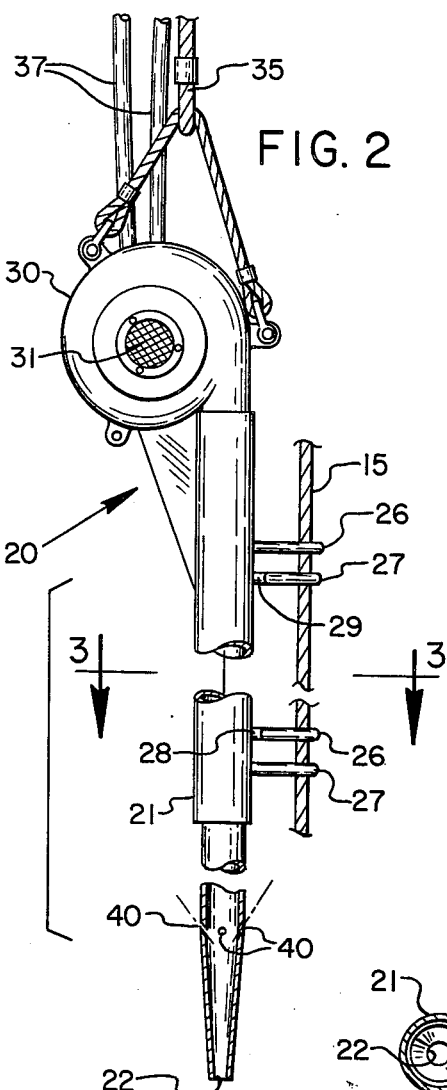
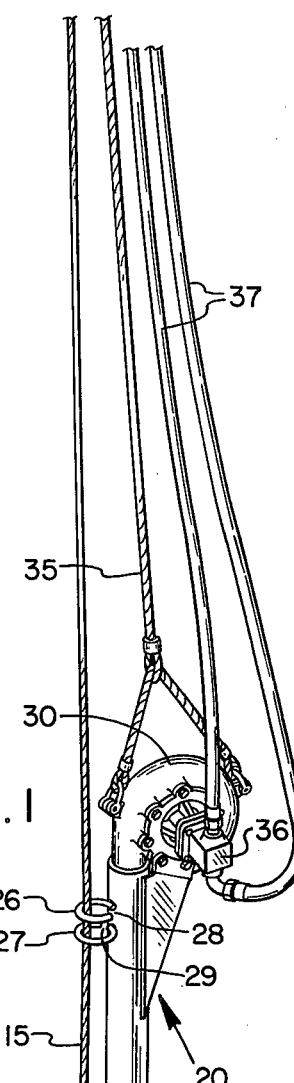
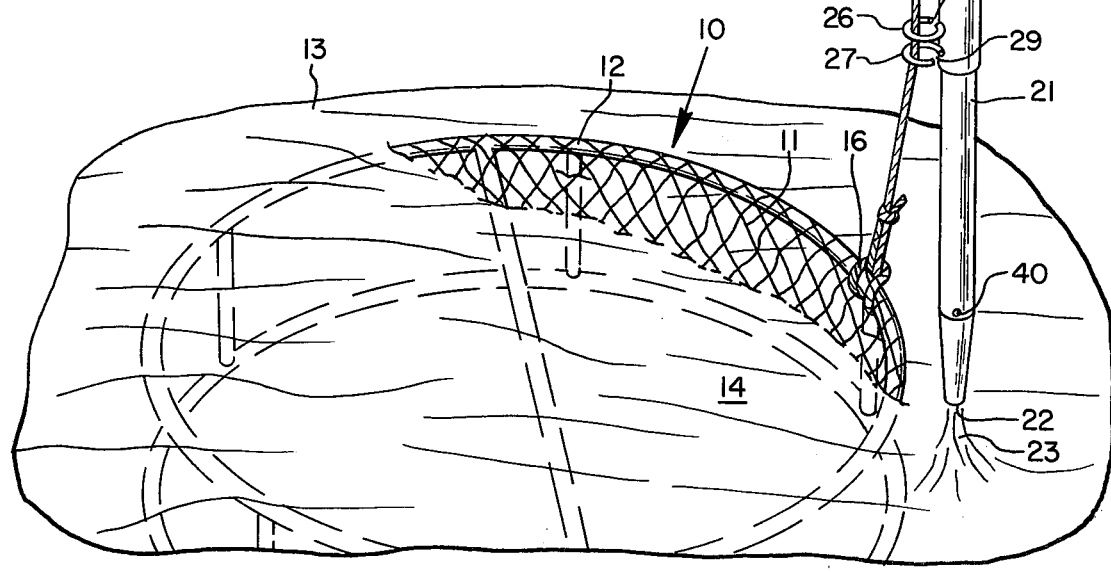

DEVICE FOR PUMPING OUT SANDED IN CRAB POTS

BACKGROUND OF THE INVENTION

This invention relates to a device for pumping out sanded in crab pots.

Crab pots on the sea bottom often become anchored securely in place by drifting sand and are frequently difficult or impossible to remove by merely pulling upward on the pot line. This causes a considerable loss to crab fishermen thru the loss of the crab pots, the loss of the crabs which are in the unretrievable pots and the loss of time in trying to extricate sanded in crab pots. Since the crab pots may be in water as deep as one hundred eighty feet there has heretofor been no satisfactory means available to recover crab pots which have become securely embedded in drifting sand on the sea bottom.

Objects of the present invention are, therefore, to provide a device for pumping out sanded in crab pots, to provide a device for the purpose described which is relatively simple and inexpensive to manufacture and which is simple and efficient in operation and to provide a device of the type described which operates efficiently without excessive power requirements in water of considerable depth.

SUMMARY OF THE INVENTION

The present device comprises an elongated vertical pipe having a nozzle opening in its lower end. Guide means on the pipe allow the pipe to be lowered along the pot line until the nozzle end reaches the drifted sand which is to be removed. A hydraulic pump on the upper end of the nozzle pipe discharges a jet of sea water downward to wash away the sand in which the crab pot is embedded.

The pump is driven by a hydraulic motor having a pair of hydraulic lines to operate the motor from the hydraulic system on a ship which tends the crab pots. The hydraulic motor circuit is isolated from the water pressure at the sea bottom whereby the ships hydraulic system does not have to overcome the sea water pressure and the device will operate with the same power requirements in deep water as in shallow water. This provides the same efficient operation regardless of the depth of the water.

The invention will be better understood and additional objects and advantages will become apparent from the following description of the preferred embodiment illustrated on the accompanying drawing. Various changes may be made, however, in the details of construction and arrangement of parts and certain features may be used without others. All such modifications within the scope of the appended claims are included in the invention.

BRIEF DESCRIPTION OF THE DRAWING

FIG. 1 is an under water perspective view of a device embodying the invention.

FIG. 2 is a side elevation view with parts broken away.

FIG. 3 is a view on line 3—3 in FIG. 2.

DESCRIPTION OF THE PREFERRED EMBODIMENT

In FIG. 1 the numeral 10 designates generally a conventional type of crab pot, or trap, comprising a wire mesh enclosure 11 on a metal frame 12. In its original placement the crab pot 10 was lowered to rest on the sea bottom 13 but it has since become firmly embedded by drifting sand 14 as a result of ocean currents along the sea bottom.

The crab pot 10 is initially lowered into position by a pot line 15 which is connected at 16 to the frame 12. The upper end of pot line 15 is connected to a marker float (not shown) on the surface of the water. When the crab pot 10 is not securely sanded in by the drifting sand 14 it is normally retrieved by the fisherman by merely hoisting up on the pot line 15. After removal of any crabs the crab pot may again be lowered by the pot line 15. But as shown in FIG. 1 it often happens that drifting sand 14 securely anchors the crab pot so that it cannot be lifted free by the pot line 15 and it cannot be released readily by any other conventional means when the water is of considerable depth.

The present device 20 comprises a vertical nozzle pipe 21 having a nozzle opening at 22 in its lower end to discharge a jet 23 of sea water downward to wash away the drifted sand 14 which holds the crab pot fast on the sea bottom. Pipe 21 is equipped with upper and lower pairs of guide rings 26 and 27 to receive pot line 15 and hold the pipe parallel with the pot line when the line is tensioned from above. In order to provide for convenient engagement with pot line 15, and disengagement therefrom, ring 26 has an opening 28 on one side and ring 27 has an opening 29 on its opposite side. Rings 26 and 27 are welded a short distance apart on pipe 21 so that pot line 15 may readily be manipulated into both rings while at the same time the rings will prevent accidental disengagement of the pot line.

A centrifugal pump 30 is mounted on the upper end of nozzle pipe 21 with the pump discharge connected with the pipe so as to produce the desired jet of water 23 from nozzle 22. Pump 30 has an inlet 31 for drawing in sea water which produces the jet 23. Pipe 21 is of sufficient length to place the sea water inlet 31 a considerable distance above nozzle end 22 so that sand loosened by the jet 23 will not be drawn into the pump inlet. A pickup line 35 is connected to the housing of pump 30 for raising and lowering the device 20 on pot line 15.

Pump 30 is driven by a rotary hydraulic motor 36 having a pair of hydraulic lines 37 connected to the hydraulic system on the ship which tends the crab pots. Lines 37 thereby provide a closed hydraulic circuit for motor 36 which is isolated from the sea water pressure whereby the operation of motor 36 is not affected by the depth of the water. No more energy is required to operate motor 36 at a great depth than at a shallow depth.

In order to minimize drag from ocean currents it is desirable to hold the various lines extending up to the surface of the water to relatively small sizes. In the present arrangement although pump 30 has a three inch diameter outlet the hydraulic lines 37 are only two and three-quarters inchs in diameter and pick up line 35 is only one and five-eights inch in diameter. Lines of this size are not seriously disturbed by the magnitude of ocean currents usually encountered. Nevertheless the present equipment is effective to wash out well sanded in crab pots in from one to three minutes. When the pot line side of the crab pot has been freed of sand an upward pull on pot line 15 will dislodge the opposite side so that the pot may be lifted.

The advantage of the present arrangement will be appreciated when it is realized that if pump 30 were on ship board it would be necessary to extend a hydraulic line somewhat larger than three inches all the way from the surface of the water down to the nozzle pipe. Also, the energy requirements of the pump would increase with the depth of water since the pump would have to overcome the sea water pressure at the nozzle 22 before any water would even start to flow out of the nozzle. At a depth of 180 feet a ship board pump would have to develop enormous pressure and consume an enormous amount of energy to produce an effective sand removing jet 23 at sea bottom pressure.

In order to prevent the device 20 from being lifted away from the sea bottom by the upward thrust reaction of jet 23 a plurality of upwardly directed nozzle openings 40 are provided in pipe 21. The water jets from nozzle openings 40 exert a downward force on pipe 21 to counteract the upward thrust of jet 23.

What is claimed is:

1. A device for pumping out a crab pot on a sea bottom, which has become embedded by drifting sand as a result of ocean currents along the sea bottom, said crab pot having a pot line extending up to the surface of the water for lifting the crab pot; said device comprising a nozzle pipe having guide means to receive said pot line and hold the nozzle pipe substantially paralled with said pot line as the device is lowered along the pot line, a pickup line connected to the upper end of the device for lowering and raising the device on said pot line, a nozzle opening in the lower end of said nozzle pipe, a hydraulic pump on the upper end of said nozzle pipe having an inlet to receive the sea water and arranged to pump said sea water through said nozzle pipe, a motor mounted on said pump for driving the pump, and power conduits of small size in relation to said nozzle pipe, so as not to be seriously disturbed by said ocean currents, extending from said motor to a source of power above the surface of the water to operate said motor; a jet of water from said nozzle opening washing away enough of said drifted sand to allow the crab pot to be lifted away from the sea bottom by said pot line.

2. A device as defined in claim 8, said motor being a hydraulic motor and said power conduits being in a hydraulic circuit for driving said motor, said hydraulic circuit being isolated from said sea water and independent of the sea water pressure.

3. A device as defined in claim 1 including nozzle openings in said nozzle pipe oriented in directions opposed to the direction of said end nozzle opening to counteract the thrust of the jet from said end nozzle opening.

* * * * *

UNITED STATES PATENT AND TRADEMARK OFFICE
CERTIFICATE OF CORRECTION

PATENT NO. : 4,073,079

DATED : February 14, 1978

INVENTOR(S) : Nathan I. Klinefelter

It is certified that error appears in the above-identified patent and that said Letters Patent are hereby corrected as shown below:

In the abstract, line 3, for "of" (first occurrence) read --on--.

Column 4, line 15, for "claim 8" read --claim 1--.

Signed and Sealed this

Ninth Day of May 1978

[SEAL]

Attest:

RUTH C. MASON
Attesting Officer

LUTRELLE F. PARKER
Acting Commissioner of Patents and Trademarks